(12) United States Patent
Yuan et al.

(10) Patent No.: US 11,943,453 B2
(45) Date of Patent: Mar. 26, 2024

(54) METHOD FOR ENCODING A VIDEO STREAM

(71) Applicant: Axis AB, Lund (SE)

(72) Inventors: Song Yuan, Lund (SE); Viktor Edpalm, Lund (SE)

(73) Assignee: Axis AB, Lund (SE)

(*) Notice: Subject to any disclaimer, the term of this patent is extended or adjusted under 35 U.S.C. 154(b) by 0 days.

(21) Appl. No.: 17/963,707

(22) Filed: Oct. 11, 2022

(65) Prior Publication Data

US 2023/0123239 A1 Apr. 20, 2023

(30) Foreign Application Priority Data

Oct. 20, 2021 (EP) .................... 21203616

(51) Int. Cl.
*H04N 19/167* (2014.01)
*H04N 19/105* (2014.01)
*H04N 19/17* (2014.01)
*H04N 19/182* (2014.01)
*H04N 19/30* (2014.01)
*H04N 19/436* (2014.01)
*H04N 19/85* (2014.01)

(52) U.S. Cl.
CPC ......... *H04N 19/167* (2014.11); *H04N 19/105* (2014.11); *H04N 19/17* (2014.11); *H04N 19/182* (2014.11); *H04N 19/30* (2014.11); *H04N 19/436* (2014.11); *H04N 19/85* (2014.11)

(58) Field of Classification Search
CPC .... H04N 19/167; H04N 19/105; H04N 19/17; H04N 19/182; H04N 19/30; H04N 19/436; H04N 19/85
See application file for complete search history.

(56) References Cited

U.S. PATENT DOCUMENTS 9,838,641 B1  12/2017  Lim et al.
2014/0270553 A1  9/2014  Zund et al.
(Continued)

FOREIGN PATENT DOCUMENTS

EP  2663076 B1  9/2016

OTHER PUBLICATIONS

Extended European Search Report dated Mar. 24, 2022 for European Patent Application No. 21203616.4.
(Continued)

*Primary Examiner* — Jae N Noh
(74) *Attorney, Agent, or Firm* — Volpe Koenig

(57) ABSTRACT

The present disclosure relates to a method for encoding a video stream. The method comprising: acquiring pixel data of the video stream having a first resolution; extracting a crop corresponding to a region of interest from the pixel data of the video stream, the crop having the first resolution; down-scaling the pixel data of the video stream into a down-scaled video stream having a second resolution lower than the first resolution; processing the down-scaled video stream through one or more video processing operations; processing the crop through the one or more video processing operations; up-scaling the processed down-scaled video stream into an up-scaled video stream having the first resolution; merging the processed crop and the up-scaled video stream into a merged video stream; and encoding the merged video stream. The present disclosure further related to a video encoding device.

12 Claims, 3 Drawing Sheets

(56) References Cited

U.S. PATENT DOCUMENTS

2020/0389621 A1    12/2020  Ryu
2021/0105488 A1     4/2021  Lancia

OTHER PUBLICATIONS

Kodukula et al., "Rhythmic pixel regions: multi-resolution visual sensing system towards high-precision visual computing at low power", 573-586 (2021).

Boyce et al., "Overview of SHVC: Scalable Extensions of the High Efficiency Video Coding Standard", IEEE Transactions on Circuits and Systems for Video Technology. 26. 1-1. (2015).

Grois et al., "Recent Advances in Region-of-interest Video Coding", Recent Advances on Video Coding, edited by Javier Lorente, IntechOpen, (2011).

METHOD FOR ENCODING A VIDEO STREAM

FIELD OF INVENTION

The present disclosure relates to the field of video technology. More particularly, it relates to a method for encoding a video stream. The present disclosure further relates to a video encoding device.

TECHNICAL BACKGROUND

There is a growing demand for high resolution video and cameras. It can be wide angle cameras such as fisheye, panorama cameras or simply high resolution cameras. These types of cameras require high throughput of data, which in turn requires high-performance video processing circuitry that is often power hungry. At the same time, there is a demand for environmentally friendly cameras with low energy consumption. The use of these high-performance video processing circuities for more mainstream surveillance cameras thus clashes with the demand for making the technology greener.

There is therefore a need for improvements when it comes to providing high resolution video but at the same time keeping the energy consumption low.

US2021105488 discloses a video encoding method. The method comprises the steps of: acquiring a video frame; selecting one or more regions of interest within the video frame; encoding the one or more regions of interest at a first resolution; and encoding a base layer, wherein the base layer includes at least a portion of the video frame not contained within the or each region of interest, at a second resolution. The first resolution is higher than the second resolution.

SUMMARY

In view of the above, it is an object of the present disclosure to provide a method for encoding a video stream in a more energy and computational power efficient way.

It has been realized that by down-scaling image data which do not depict any regions of interest very early in an image processing pipeline, such as right after capture, computational power can be saved, and thus also the energy consumption. Only the regions of interest are processed at full resolution to satisfy the need for high resolution of the video.

According to a first aspect, a method for encoding a video stream is presented. The method comprising: acquiring pixel data of the video stream having a first resolution; extracting a crop corresponding to a region of interest from the pixel data of the video stream, the crop having the first resolution; down-scaling the pixel data of the video stream into a down-scaled video stream having a second resolution lower than the first resolution; processing the down-scaled video stream through one or more video processing operations; processing the crop through the one or more video processing operations; up-scaling the processed down-scaled video stream into an up-scaled video stream having the first resolution; merging the processed crop and the up-scaled video stream into a merged video stream; and encoding the merged video stream. The one or more video processing operations comprise at least one of a noise reduction function, a rotation function, an image sensor correction function, an image scaling function, a gamma correction function, an image enhancement function, a color space conversion function and a chroma subsampling function.

By the term "pixel data" it is hereby meant that the data of the video stream comprises information about pixel values of the video stream.

By the term "resolution" it is hereby meant the number of pixels in each dimension, i.e., width and height, of the video stream. In light of this, the term "up-scaling" and "down-scaling" refers to an increase and decrease in resolution respectively.

By the term "region of interest" it is hereby meant a region of the scene depicted in the video stream, that is of particular interest. A region may be of interest based on e.g., movement in the scene, a certain object detected in the scene or present at a certain area of the scene.

It should be noted that the down-scaled video stream and the crop preferably are processed through the same video processing operations. Such processing simplifies the subsequent merging of the processed crop and the up-scaled video stream.

It should be noted that the merged video stream has a resolution which is higher than the second resolution. The merged video stream preferably has the first resolution.

As mentioned above, a possible associated advantage is that only parts of the video stream which depicts regions of interest are processed at full resolution. The rest of the video stream is processed in a down-scaled form, thus facilitating for a reduction in the computational load on a device processing the video stream. After the processing, the down-scaled part of the video stream is up-scaled to match the resolution of the crop. This allows the now up-scaled video stream to be merged with the processed crop to form a merged video stream. At least, the portion(s) of the merged video stream belonging to the region of interest will have the original first resolution. Further, the present method facilitates saving on memory bandwidth due to the processing of the down-scaled video stream.

The method may further comprise encoding the processed down-scaled video stream using a scalable video encoding scheme. The act of encoding the merged video stream may comprise using the encoded down-scaled video stream as a base layer. Put differently, the encoded down-scaled video stream can be utilized in the encoding of the high-resolution merged video stream. A possible associated advantage provided by this is that a more computational and power efficient encoding of the merged video stream is facilitated. According to this the high resolution information of the crop may be encoded based on a scaled up version of the low resolution video enabling, for the combined high resolution video, reuse of all non-ROI areas as well as a good base prediction for the high resolution video and its motion vectors. The end result is a single video, much smaller than a full high resolution video, which is full resolution and from which a low resolution video easily can be extracted.

The region of interest may be a sub-portion of a scene depicted by the video stream. Put differently, the region of interest may be a sub-section of the video stream. The sub-portion may be a single area of the scene depicted by the video stream. The sub-portion may comprise a number of non-contiguous areas of the scene depicted by the video stream.

The method may further comprise identifying the region of interest in a scene depicted by the video stream.

The act of identifying the region of interest may be performed by processing the acquired pixel data of the video stream through an attention model.

By the term "attention model" it is hereby meant a model for identifying the region of interest from the pixel data of the video stream.

The attention model may be based on at least one of an object detection model, and object classification model, a motion detection model, user defined input or a combination thereof.

The act of acquiring the pixel data of the video stream may comprise capturing the pixel data by an image sensor.

The one or more video processing operations may be at least one of a noise reduction function, a transformation function, a rotation function, a privacy mask function, an image sensor correction function, an image scaling function, a gamma correction function, an image enhancement function, a color space conversion function, a chroma subsampling function, a compression function, a data storage function, and a data transmission function.

According to a second aspect, a video encoding device for encoding a video stream is presented. The video encoding device comprises circuitry configured to execute: an acquiring function configured to acquire pixel data of the video stream having a first resolution; an extracting function configured to extract a crop corresponding to a region of interest from the pixel data of the video stream, the crop having the first resolution; a down-scaling function configured to down-scale the pixel data of the video stream into a down-scaled video stream having a second resolution lower than the first resolution; a video processing function configured to process the down-scaled video stream through one or more video processing operations of a video processing pipeline and configured to process the crop through the one or more video processing operations of the video processing pipeline; an up-scaling function configured to up-scale the processed down-scaled video stream into an up-scaled video stream having the first resolution; a merging function configured to merge the processed crop and the up-scaled video stream into a merged video stream; and a first encoding function configured to encode the merged video stream. The one or more video processing operations comprises at least one of a noise reduction function, a rotation function, an image sensor correction function, an image scaling function, a gamma correction function, an image enhancement function, a color space conversion function and a chroma subsampling function.

The circuitry may be further configured to execute a second encoding function configured to encode the processed down-scaled video stream using a scalable video encoding scheme. The first encoding function may be configured to encode the merged video stream using the encoded processed down-scaled video stream as a base layer.

The circuitry may be further configured to execute a region of interest identifying function configured to identify the region of interest in a scene depicted by the video stream.

The video processing function may be configured to process both the down-scaled video stream and the crop through the same one or more video processing operations of a video processing pipeline.

A video processing operation of the video processing pipeline may be implemented as a computer software portion run on a general purpose processor or on a graphics processing unit, a field-programmable gate array, a fixed-function application-specific integrated circuit, or an analog circuit.

The above-mentioned features and advantages of the first aspect, when applicable, apply to the second aspect as well. To avoid undue repetition, reference is made to the above.

According to a third aspect, a non-transitory computer readable recording medium having recorded thereon program code which when executed at a device having processing capabilities is configured to perform the method according to the first aspect, is presented.

The above-mentioned features and advantages of the first and second aspects, when applicable, apply to the third aspect as well. To avoid undue repetition, reference is made to the above.

Still other objectives, features, aspects, and advantages of the disclosure will appear from the following detailed description as well as from the drawings. The same features and advantages described with respect to one aspect are applicable to the other aspects unless explicitly stated otherwise.

BRIEF DESCRIPTION OF THE DRAWINGS

The above and other aspects of the present concepts will now be described in more detail, with reference to appended drawings showing variants of the disclosure. The figures should not be considered limiting the disclosure to the specific variant; instead they are used for explaining and understanding the concepts.

As illustrated in the figures, the sizes of layers and regions are exaggerated for illustrative purposes and, thus, are provided to illustrate the general structures of variants of the present inventive concept. Like reference numerals refer to like elements throughout.

DETAILED DESCRIPTION

The present concepts will now be described more fully hereinafter with reference to the accompanying drawings, in which currently preferred variants of the concepts are shown. These concepts may, however, be implemented in many different forms and should not be construed as limited to the variants set forth herein. Rather, these variants are provided for thoroughness and completeness, and fully convey the scope of the present concepts to the skilled person.

A method for encoding a video stream, as well as a video encoding device will now be described with reference to FIG. 1 to FIG. 4.

Figure 1:
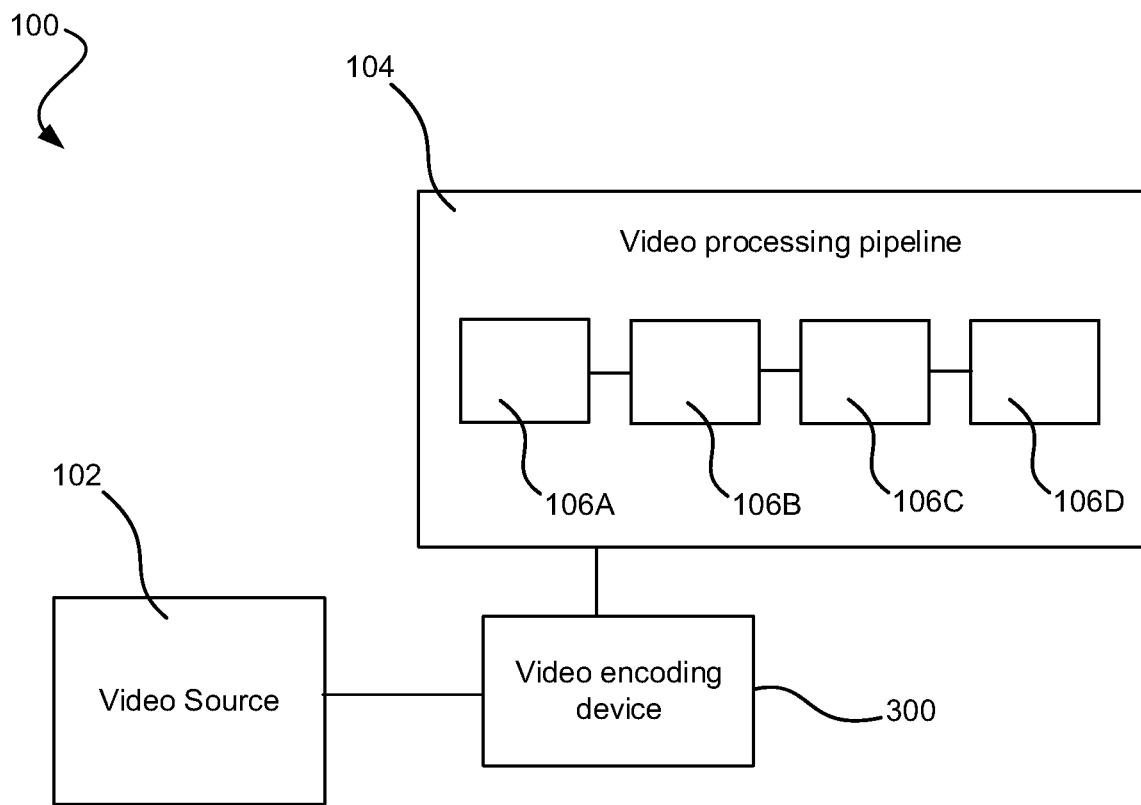
FIG. 1 schematically illustrates a system for encoding a video stream.

FIG. 1 schematically illustrates a system 100 comprising the video encoding device 300 according to the present disclosure. The video encoding device 300 is further described in connection with FIG. 3. FIG. 1 presents an example of how the video encoding device 300 can be implemented. The video encoding device 300 is connected to a video source 102. The video source 102 provide a video stream to the video encoding device 300. The video source 102 may be an image sensor. The video source 102 may be an image rendering engine.

The video encoding device 300 is connected to a video processing pipeline 104. The video processing pipeline 104 is configured to perform one or more video processing operations 106A-D. The one or more video processing operations 106A-D comprises one of more of a noise reduction function, a transformation function, a rotation function, a privacy mask function, image sensor correction function, image scaling function, gamma correction function, image enhancement function, color space conversion function, chroma subsampling function, compression function, data storage function and data transmission function. The image sensor correction function may comprise a Bayer filter.

The color space conversion function may comprise conversions between different formats, such as RGB, YUV and YCbCr. The video processing pipeline 104 may be provided as an integral part of the video encoding device 300, even though it in this example, is illustrated as external to the video encoding device 300. In other words, the video processing pipeline 104 may be part of the video encoding device 300. The connections between the video source 102, the video encoding device 300 and the video processing pipeline 104 is preferably wired connections.

Figure 2:
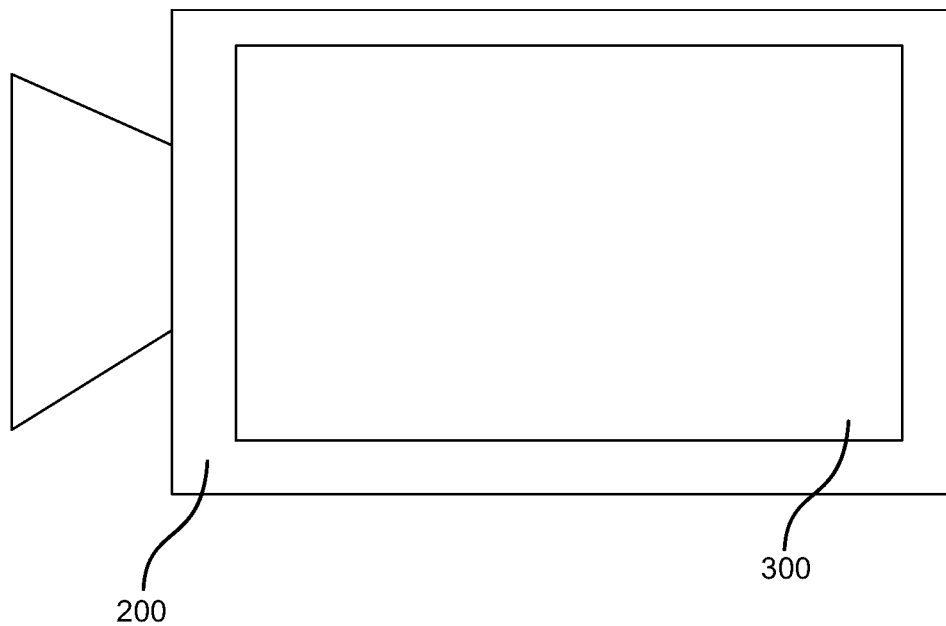
FIG. 2 schematically illustrates, by way of example, a camera comprising a video encoding device according to the present disclosure.

FIG. 2 illustrates, by way of example, a camera 200. The camera 200 comprises the video encoding device 300 according to the present disclosure. The system 100 as described in connection with FIG. 1 may be implemented into a single device, such as the camera 200 as illustrated herein. The camera 200 may be a monitoring or surveillance camera. As is readily apparent to a skilled person, the camera 200 comprises other components necessary for the camera 200 to work, such as a power supply unit, a memory etc. These has been left out for illustrative purposes.

Figure 3:
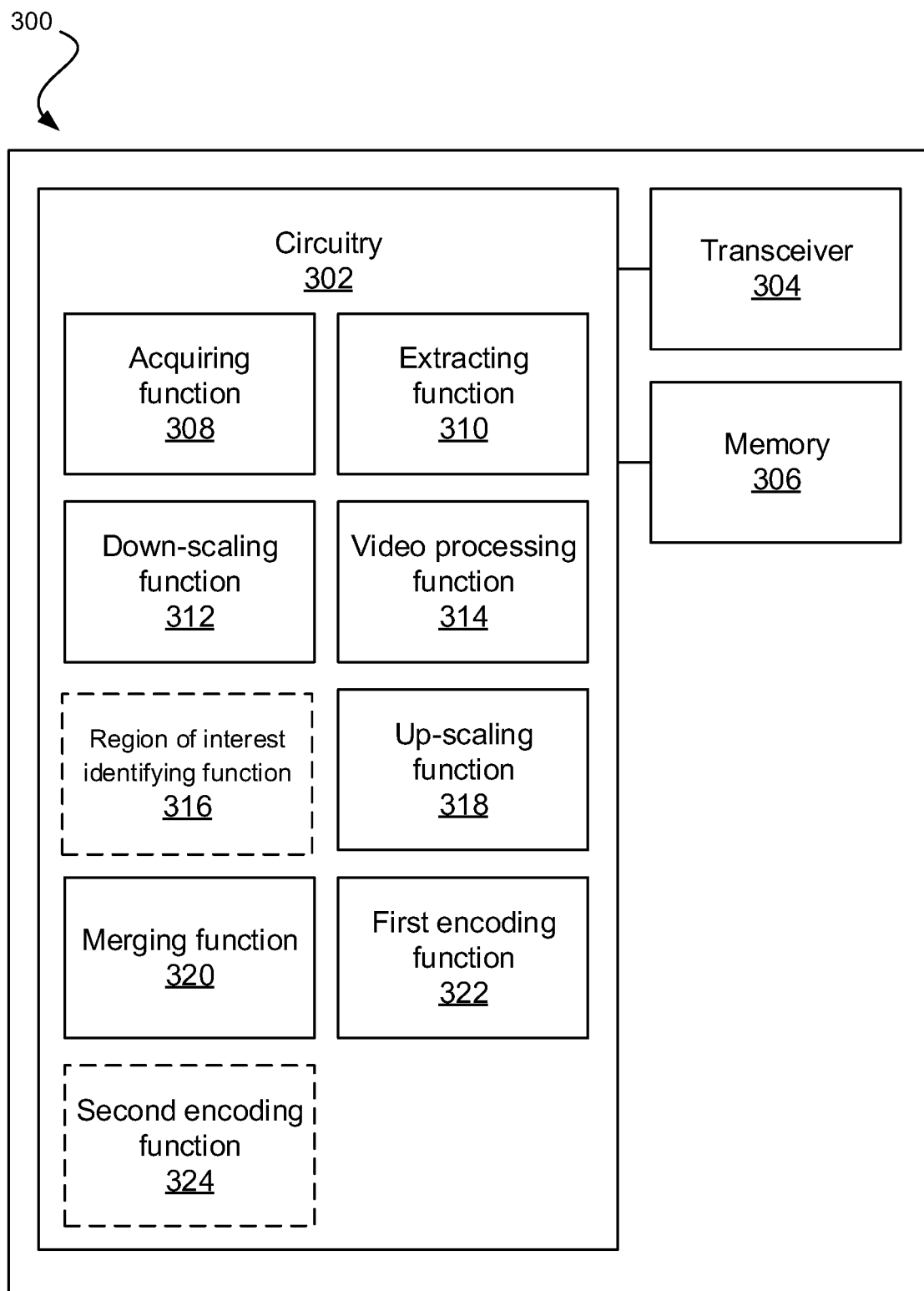
FIG. 3 schematically illustrates, by way of example, the video encoding device according to the present disclosure.

FIG. 3 schematically illustrates the video encoding device 300 as described in connection with FIGS. 1 and 2. The video encoding device 300 comprises circuitry 302.

The circuitry 302 is any type of circuitry 302 comprising a processing unit. The circuitry 302 may physically comprise one single circuitry module. Alternatively, the circuitry 302 may be distributed over several circuitry modules. The video encoding device 300 may further comprise a transceiver 304 and a memory 306. The circuitry 302 is communicatively connected to the transceiver 304 and the memory 306.

The circuitry 302 is configured to carry out overall control of functions and operations of the video encoding device 300. The circuitry 302 comprises a processing unit, such as a central processing unit (CPU), microcontroller, or microprocessor. The processing unit may be configured to execute program code stored in the memory 306, in order to carry out functions and operations of the circuitry 302.

The transceiver 304 is configured to enable the circuitry 302 to communicate with other devices. The transceiver 304 is configured to exchange data with the circuitry 302 over a data bus. Accompanying control lines and an address bus between the transceiver 304 and the circuitry 302 also may be present.

The memory 306 may be one or more of a buffer, a flash memory, a hard drive, a removable media, a volatile memory, a non-volatile memory, a random access memory (RAM), or another suitable device. In a typical arrangement, the memory include a non-volatile memory for long term data storage and a volatile memory that functions as system memory for the video encoding device 300. The memory 306 is configured to exchange data with the circuitry 302 over a data bus. Accompanying control lines and an address bus between the memory 306 and the circuitry 302 also may be present.

Functions and operations of the video encoding device 300 may be embodied in the form of executable logic routines (e.g., lines of code, software programs, etc.) that are stored on a non-transitory computer readable recording medium (e.g., the memory) of the video encoding device 300 and are executed by the circuitry 302 (e.g., using the processor). Furthermore, the functions and operations of the circuitry 302 may be a stand-alone software application or form a part of a software application that carries out additional tasks related to the circuitry 302. The described functions and operations may be considered a method that the corresponding device is configured to carry out. Such as the method discussed below in connection with FIG. 4. Also, while the described functions and operations may be implemented in software, such functionality may as well be carried out via dedicated hardware or firmware, or some combination of hardware, firmware and/or software. The following functions may be stored on the non-transitory computer readable recording medium.

The circuitry 302 is configured to execute an acquiring function 308, configured to acquire pixel data of the video stream having a first resolution.

The circuitry 302 is further configured to execute an extracting function 310, configured to extract a crop corresponding to a region of interest from the pixel data of the video stream. Hence, the crop includes pixel data representing the region of interest but not all the pixel data of each image frame in the video stream. The crop being a cut out of pixel data from image frames in the video stream. The crop having the first resolution.

The circuitry 302 is further configured to execute a down-scaling function 312, configured to down-scale the pixel data of the video stream into a down-scaled video stream. The down-scaled video stream having a second resolution. The second resolution being lower than the first resolution.

The circuitry 302 is further configured to execute a video processing function 314, configured to process the down-scaled video stream through one or more video processing operations 106A-D of a video processing pipeline 104. The video processing function 314 is further configured to process the crop through the one or more video processing operations 106A-D of the video processing pipeline 104. The down-scaled video stream and the crop may be processed through the video processing pipeline 104 simultaneously, i.e., in parallel. The down-scaled video stream and the crop may be processed through the video processing pipeline 104 sequentially, i.e., one after the other.

Some of the one or more video processing operations 106A-D may be dependent on each other. Hence, they need to be executed one after another. Some of the one or more video processing operations 106A-D may be independent on each other. Hence, they may be executed in parallel.

The circuitry 302 is further configured to execute an up-scaling function 318 configured to up-scale the processed down-scaled video stream into an up-scaled video stream. Preferably, the up-scaled video stream has the first resolution.

The circuitry 302 is further configured to execute a merging function 320 configured to merge the processed crop and the up-scaled video stream into a merged video stream. The merged video stream preferably having the first resolution.

The circuitry 302 is further configured to execute a first encoding function 322 configured to encode the merged video stream.

The circuitry 302 may be configured to execute a second encoding function 324 configured to encode the down-scaled video stream using a scalable video encoding scheme, e.g., SVC for H.264, SHVC for H.265 or LCEVC or SVT-AV1. The first encoding function 322 may be configured to encode the merged video stream using the encoded processed down-scaled video stream as a base layer. Operations of the second encoding function 324 may be incorporated into the first encoding function 322.

The circuitry 302 may be configured to execute a region of interest identifying function 316 configured to identify the region of interest in a scene depicted by the video stream. Alternatively, or in combination, the region of interest may be identified using external data. By the term "external data" it is hereby meant data which are not related to the video stream. For example, external motion sensors may be communicatively connected to the video encoding device 300 to provide information about where and/or when motion is detected in the area which the video stream depicts. An example of such an external motion sensor is a radar sensor.

The video processing function 314 is preferably configured to process both the down-scaled video stream and the crop through the same one or more video processing operations 106A-D of a video processing pipeline 104.

Figure 4:
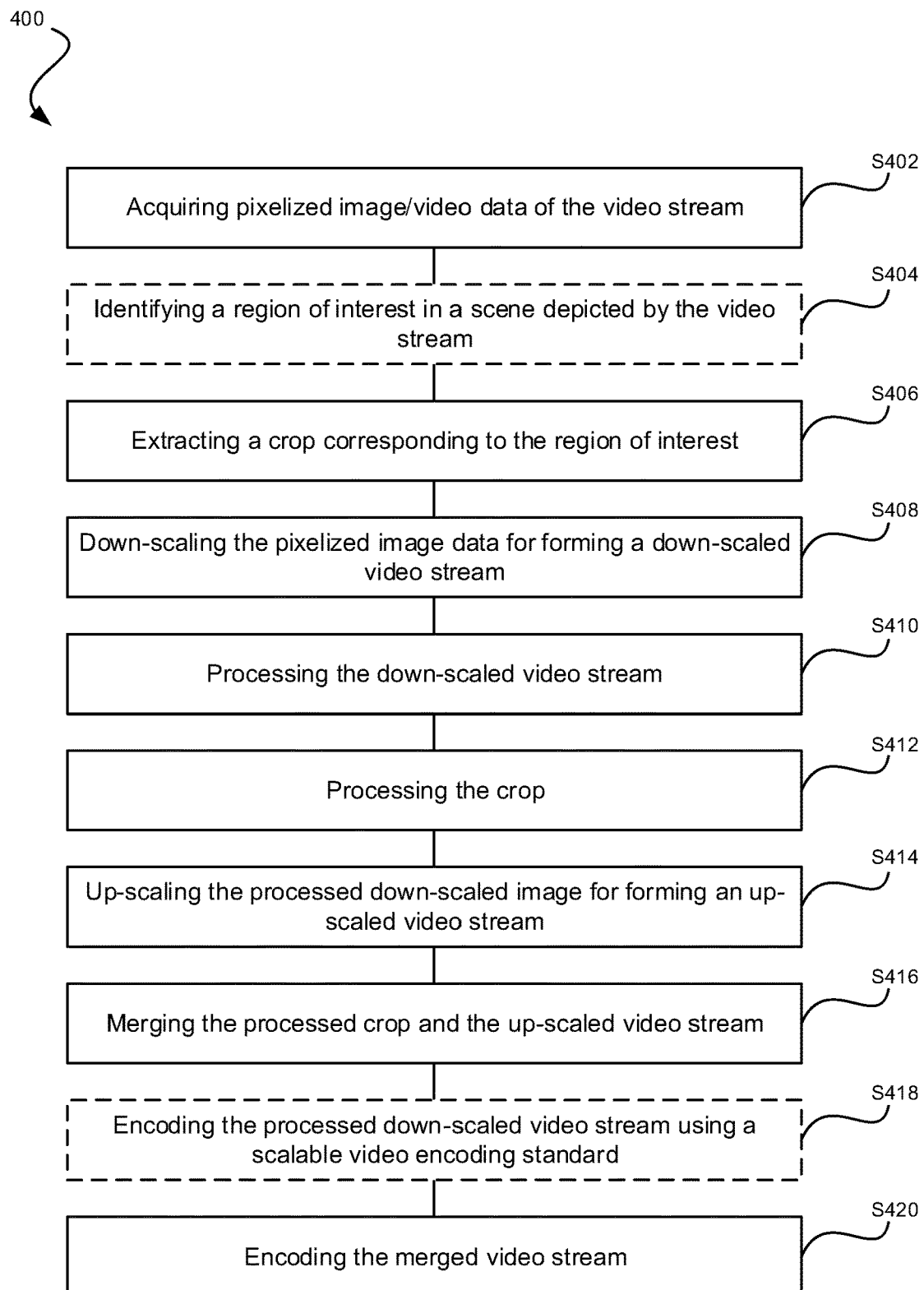
FIG. 4 is a flowchart illustrating the steps of a method for encoding a video stream according to the present disclosure.

FIG. 4 is a flow chart illustrating the steps of the method 400 for encoding a video stream. Below, the different steps are described in more detail. Even though illustrated in a specific order, the steps of the method 400 may be performed in any suitable order, in parallel, as well as multiple times. Blocks with dashed outline should be interpreted as optional steps of the method 400.

Pixel data of the video stream is acquired S402, the video stream having a first resolution. Acquiring the pixel data of the video stream may comprise capturing the pixel data by an image sensor. The video stream comprising a series of image frames.

A crop corresponding to a region of interest is extracted S406 from the pixel data of the video stream, the crop having the first resolution. The region of interest is a sub-portion of a scene depicted by the video stream. Hence, the crop includes pixel data representing the region of interest but not all the pixel data of each image frame in the video stream. The crop being a cut out of pixel data from image frames in the video stream.

The pixel data of the video stream is down-scaled S408 into a down-scaled video stream. The down-scaled video stream having a second resolution. The second resolution is lower than the first resolution. Pixel data of the down-scaled video stream contains less data than the pixel data of the original video stream. Thus, the down-scaled video stream can be processed using less computational resources.

The down-scaled video stream is processed S410 through one or more video processing operations 106A-D. The crop is processed S412 through the one or more video processing operations 106A-D. It should be noted that the down-scaled video stream and the crop is preferably processed by the same video processing operations. The one or more video processing operations 106A-D comprises one or more of a noise reduction function, a transformation function, a rotation function, a privacy mask function, an image sensor correction function, an image scaling function, a gamma correction function, an image enhancement function, a color space conversion function, a chroma subsampling function, a compression function, a data storage function, and a data transmission function. The processing of the down-scaled video stream and the crop should be interpreted as operations typically performed on captured pixel data prior to encoding.

The processed down-scaled video stream is up-scaled S414 into an up-scaled video stream. The up-scaled video stream preferably having the first resolution. Up-scaling the video stream allows for the up-scaled video stream to be merged with a high resolution video stream preferably having the first resolution.

The processed crop and the up-scaled video stream are merged S416 into a merged video stream. In other words, the processed crop is combined with the up-scaled video stream into a single video stream which is the merged video stream. The merged video stream is thus a video stream where pixel data of areas in the video stream depicting a region of interest contains relatively large amount of information, whereas pixel data of areas of less importance contains relatively little information.

The merged video stream is encoded S420. The merged video stream may be encoded using standard encoding schemes, e.g., H.262 (MPEG-2 Part 2), MPEG-4 Part 2, H.264 (MPEG-4 Part 10), HEVC (H.265), Theora, RealVideo RV40, VP9, and AV1.

The down-scaled video stream may be encoded S418 using a scalable video encoding scheme. The act of encoding S420 the merged video stream may comprise using the encoded down-scaled video stream as a base layer.

The method may comprise identifying S404 the region of interest in a scene depicted by the video stream. In other words, the region of interest is determined from what is depicted by the video stream. Identifying S404 the region of interest may be performed by processing the acquired pixel data of the video stream through an attention model. In other words, the attention model is configured to identify the region of interest by analyzing the pixel data of the video stream. The attention model may be based on at least one of an object detection model, and object classification model, a motion detection model, user defined input or a combination thereof. An example of object detection and/or object classification may be that certain objects can be marked as being of interest. For example, the presence of people may be of particular interest. In such case, regions of the video stream depicting the people may be treated as regions of interest. More specifically, faces of the people may be of particular interest. Then, only the faces need to be processed at full resolution. An example of the motion detection model may be when areas of the video stream which depicts a moving object are to be treated as a region of interest. An example of user defined input may be that the user marks sub-portions of the scene depicted by the video stream as of interest. In the case of surveillance cameras, it could be doorways or walkways in the scene depicted by the video stream. Alternatively, or in combination, the region of interest may be identified based on external data. By the term "external data" it is hereby meant data which are not related to the video stream. For example, the region of interest may be identified from a sensor signal of an external motion sensor, such as a radar sensor.

Additionally, variations to the disclosed variants can be understood and effected by the skilled person in practicing the claimed disclosure, from a study of the drawings, the disclosure, and the appended claims.

The invention claimed is:

1. A method for encoding a video stream, the method comprising:
    acquiring pixel data of the video stream;
    extracting a crop corresponding to a region of interest from the pixel data, the crop having the first resolution;
    down-scaling the pixel data into a down-scaled video stream having a second resolution lower than the first resolution;
    processing the down-scaled video stream through one or more video processing operations, the one or more video processing operations comprises at least one of a noise reduction function, a rotation function, an image sensor correction function, an image scaling function, a gamma correction function, an image enhancement function, a color space conversion function and a chroma subsampling function;

processing the crop through the one or more video processing operations;

up-scaling the processed down-scaled video stream into an up-scaled video stream having the first resolution;

merging the processed crop and the up-scaled video stream into a merged video stream; and encoding the merged video stream.

2. The method according to claim 1, further comprising:
encoding the processed down-scaled video stream using a scalable video encoding scheme;
wherein encoding the merged video stream comprises using the encoded down-scaled video stream as a base layer.

3. The method according to claim 1, wherein the region of interest is a sub-portion of a scene depicted by the video stream.

4. The method according to claim 1, further comprising identifying the region of interest in a scene depicted by the video stream.

5. The method according to claim 4, wherein identifying the region of interest is performed by processing the acquired pixel data of the video stream through an attention model.

6. The method according to claim 5, wherein the attention model is based on at least one of an object detection model, and object classification model, a motion detection model, user defined input or a combination thereof.

7. The method according to claim 1, wherein acquiring the pixel data comprises capturing the pixel data by an image sensor.

8. A video encoding device for encoding a video stream, the video encoding device comprising circuitry configured to execute:
an acquiring function configured to acquire pixel data of the video stream having a first resolution;
an extracting function configured to extract a crop corresponding to a region of interest from the pixel data, the crop having the first resolution;
a down-scaling function configured to down-scale the pixel data into a down-scaled video stream having a second resolution lower than the first resolution;
a video processing function configured to process the down-scaled video stream through one or more video processing operations of a video processing pipeline and configured to process the crop through the one or more video processing operations of the video processing pipeline, the one or more video processing operations comprises at least one of a noise reduction function, a rotation function, an image sensor correction function, an image scaling function, a gamma correction function, an image enhancement function, a color space conversion function and a chroma subsampling function;
an up-scaling function configured to up-scale the processed down-scaled video stream into an up-scaled video stream having the first resolution;
a merging function configured to merge the processed crop and the up-scaled video stream into a merged video stream; and
a first encoding function configured to encode the merged video stream.

9. The video encoding device according to claim 8, wherein the circuitry is further configured to execute:
a second encoding function configured to encode the processed down-scaled video stream using a scalable video encoding scheme; and
wherein the first encoding function is configured to encode the merged video stream using the encoded processed down-scaled video stream as a base layer.

10. The video encoding device according to claim 8, wherein the circuitry is further configured to execute a region of interest identifying function configured to identify the region of interest in a scene depicted by the video stream.

11. The video encoding device according to claim 8, wherein the video processing function is configured to process both the down-scaled video stream and the crop through the same one or more video processing operations of a video processing pipeline.

12. A non-transitory computer readable recording medium having recorded thereon program code which when executed at a device having processing capabilities is configured to perform a method for encoding a video stream, the method comprising:
acquiring pixel data of the video stream;
extracting a crop corresponding to a region of interest from the pixel data, the crop having the first resolution;
down-scaling the pixel data into a down-scaled video stream having a second resolution lower than the first resolution;
processing the down-scaled video stream through one or more video processing operations, the one or more video processing operations comprises at least one of a noise reduction function, a rotation function, an image sensor correction function, an image scaling function, a gamma correction function, an image enhancement function, a color space conversion function and a chroma subsampling function;
processing the crop through the one or more video processing operations;
up-scaling the processed down-scaled video stream into an up-scaled video stream having the first resolution;
merging the processed crop and the up-scaled video stream into a merged video stream; and
encoding the merged video stream.

* * * * *